United States Patent
Lien

(10) Patent No.: US 8,281,799 B2
(45) Date of Patent: Oct. 9, 2012

(54) VALVE SET

(76) Inventor: Chien-Ping Lien, Taipei Hsien (TW)

( * ) Notice: Subject to any disclaimer, the term of this patent is extended or adjusted under 35 U.S.C. 154(b) by 296 days.

(21) Appl. No.: 12/783,516

(22) Filed: May 19, 2010

(65) Prior Publication Data

US 2011/0284105 A1    Nov. 24, 2011

(51) Int. Cl.
*F16K 15/20* (2006.01)

(52) U.S. Cl. .......... 137/228; 137/223; 137/232

(58) Field of Classification Search .......... 137/223, 137/228, 232, 535, 863, 522, 523, 843, 851–856; 251/82, 83, 149.6, 349, 353, 319, 347, 354; 441/41

See application file for complete search history.

(56) References Cited

U.S. PATENT DOCUMENTS

| | | | | |
|---|---|---|---|---|
| 3,903,915 A | * | 9/1975 | Rosaz | 137/232 |
| 5,203,831 A | * | 4/1993 | Lind et al. | 137/223 |
| 5,697,410 A | * | 12/1997 | Rutter et al. | 251/149.6 |
| 6,325,092 B1 | * | 12/2001 | Pirkle | 251/149.6 |
| 6,460,560 B1 | * | 10/2002 | Weinheimer et al. | 137/232 |
| 6,648,004 B2 | * | 11/2003 | Lau | 137/223 |
| 6,929,021 B2 | * | 8/2005 | Cavenagh | 137/223 |
| 6,990,994 B2 | * | 1/2006 | Reeb et al. | 137/223 |
| 7,051,753 B1 | * | 5/2006 | Caires et al. | 137/232 |
| 7,066,442 B2 | * | 6/2006 | Rose | 137/223 |
| 7,121,302 B2 | * | 10/2006 | Hwang | 251/82 |
| 7,438,081 B1 | * | 10/2008 | Chen | 137/223 |
| 2008/0223449 A1 | * | 9/2008 | Culp et al. | 137/232 |

* cited by examiner

*Primary Examiner* — Craig Schneider
*Assistant Examiner* — Craig J Price

(57) ABSTRACT

A valve set includes a valve body which includes a central hole and multiple passages are located around the central hole. A tubular portion extends from the valve body a flexible plate has an insertion inserted into the central hole of the valve body and the flexible plate seals the passages from an underside of the valve body. A core member is securely engaged with the tubular portion has an inlet tube. Multiple releasing probes extend from an underside thereof. A spring is mounted to the inlet tube and biased between a shoulder on the inlet tube and an inner surface of the valve body. A bottom cap is connected to the underside of the valve body. Air is introduced into the valve set via the inlet tube and released by pushing the core member and the releasing probes push the flexible plate away from the passages.

4 Claims, 5 Drawing Sheets

VALVE SET

FIELD OF THE INVENTION

The present invention relates to a valve set, and more particularly, to a valve set which includes simple structure and easily to use.

BACKGROUND OF THE INVENTION

A conventional valve set known to applicant generally includes a valve body, an inlet nozzle, a core member and a spring. The valve body includes a passage defined in a side thereof and a hole is defined in the underside of the valve body. A top space and a bottom space are defined in the valve body, an annular protrusion is located between the top and bottom spaces and a notch is defined in the annular protrusion so as to communicate with the hole. The core member is located in the bottom space. The inlet nozzle includes a recess at one end and a flat portion at the other end, the flat portion has a groove communicating with the recess. The advantage is that the inlet nozzle automatically seals after the introduction of air into the valve set so that the valve set is used on toys and suitable for children to use. However, the hole and the two spaces are defined individually so that the structure is complicated. Besides, the introduction of air into the valve set has to rely on the user of pump or similar inflating device, and this is not convenient for the users.

The present invention intends to provide a valve set that improves the structure and eliminates the shortcomings of the conventional valve set.

SUMMARY OF THE INVENTION

The present invention relates to a valve set which comprises a valve body, a flexible plate, a core member, a spring and a bottom cap. The valve body has a central hole defined therethrough and multiple passages are defined around the central hole. A tubular portion extends from the valve body and has a lip extending inward from an inner periphery thereof. The flexible plate has an insertion inserted into the central hole of the valve body and the flexible plate seals the passages from an underside of the valve body. The core member is engaged with the tubular portion and restricted by the lip. An inlet tube extends from the core member and has a shoulder on an outer surface thereof. Multiple releasing probes extend from an underside thereof. The spring is mounted to the inlet tube and biased between the shoulder and an inner surface of the valve body. The bottom cap is connected to the underside of the valve body.

The primary object of the present invention is to provide a valve set that has simple structure and easily to use.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
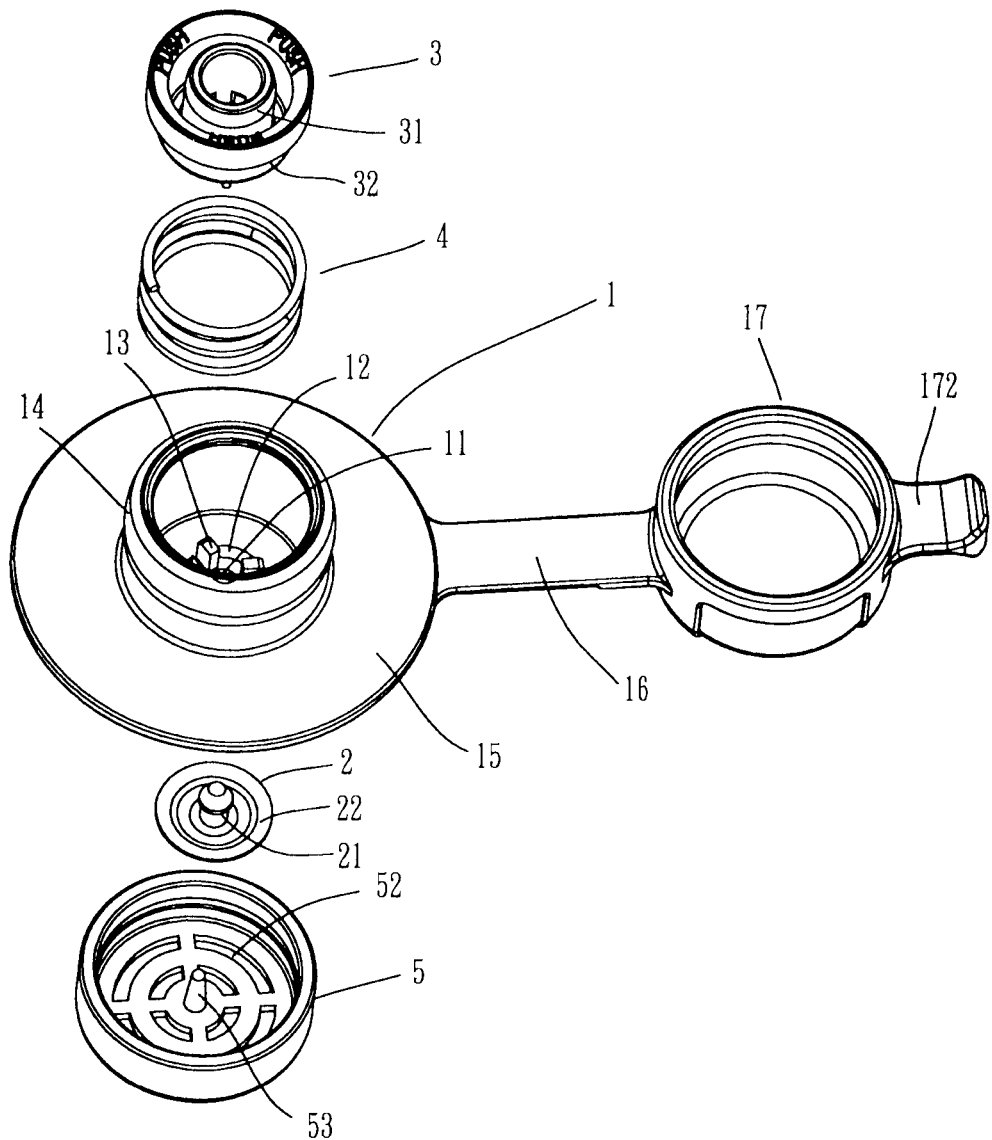
FIG. 1 is an exploded view to show the valve set of the present invention.
Figure 2:
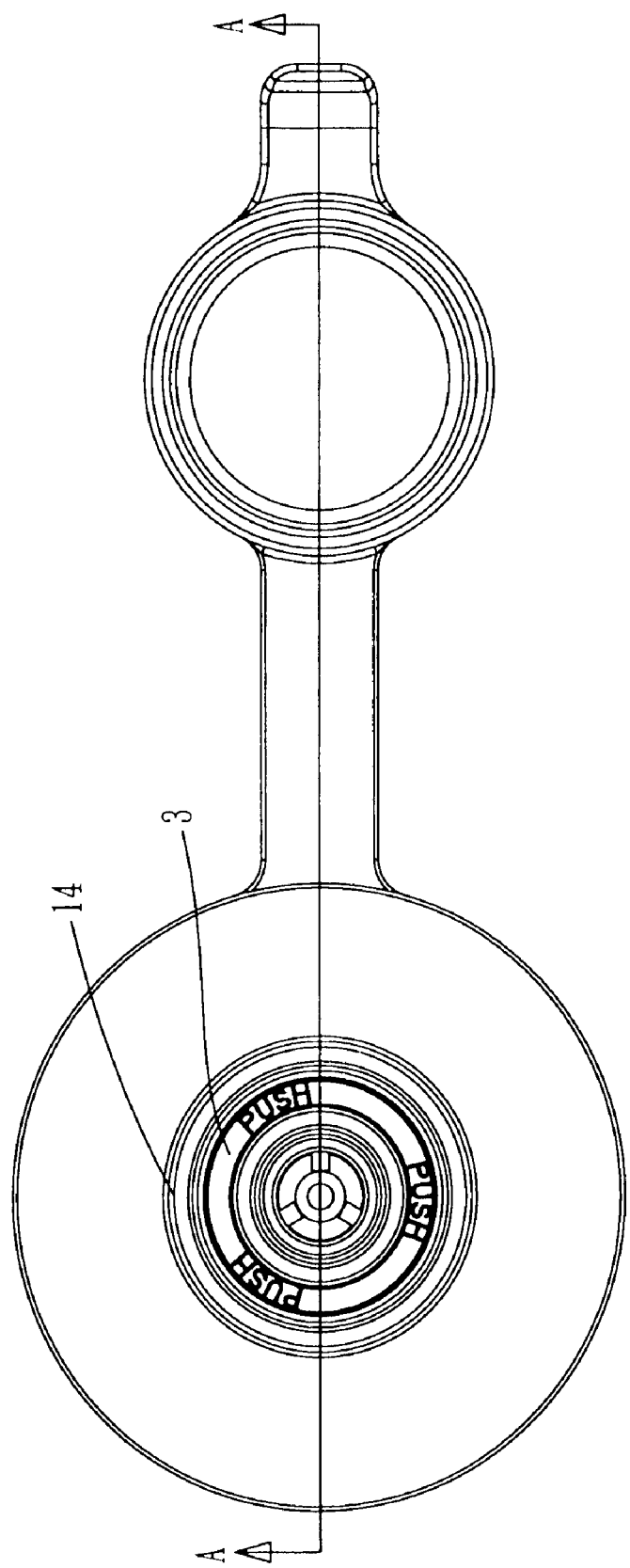
FIG. 2 is a top view of the valve set of the present invention.
Figure 3:
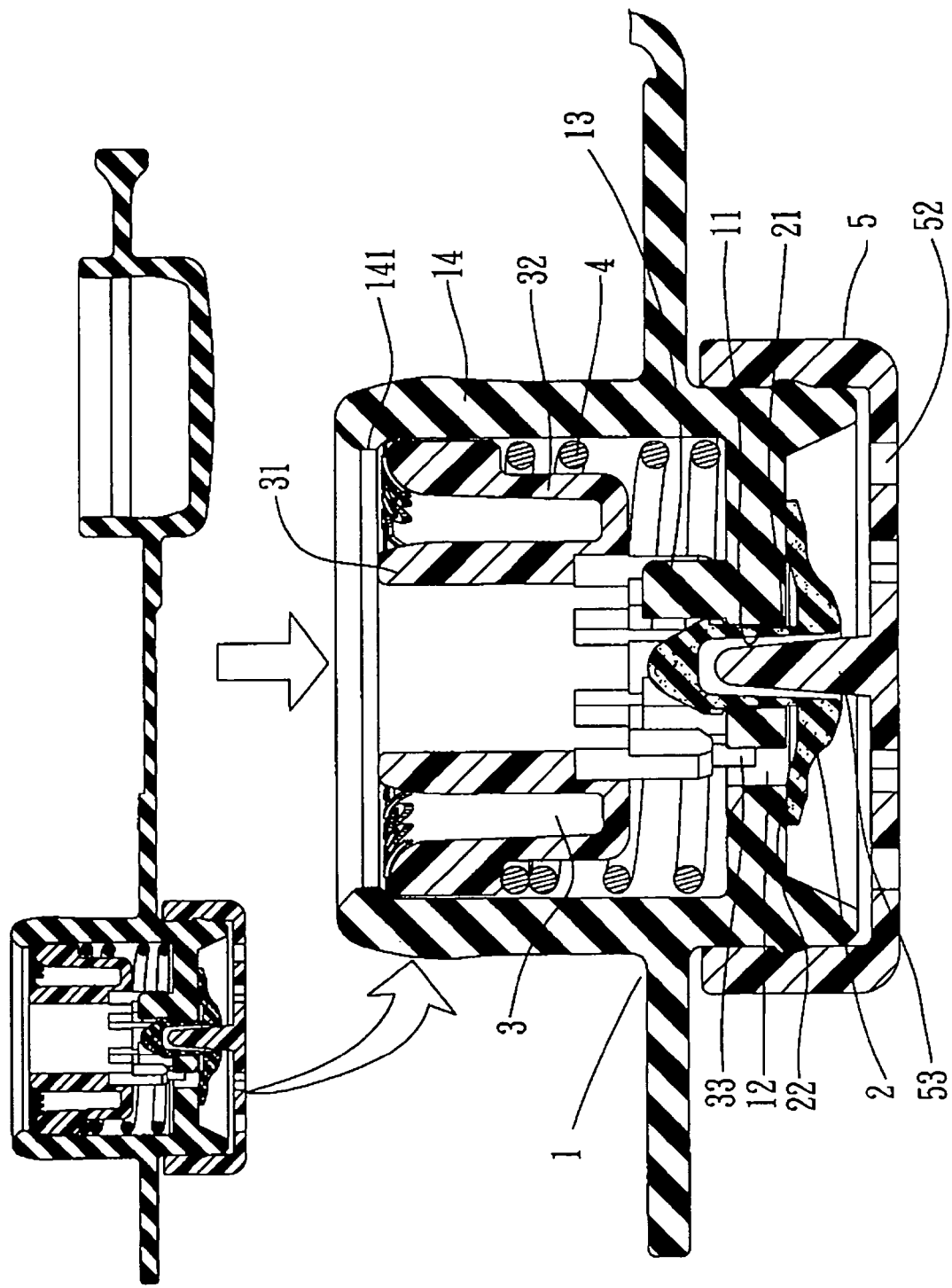
FIG. 3 is a cross sectional view, taken along line A-A in FIG. 2 of the valve set of the present invention, wherein the passages of the valve body are sealed by the flexible plate.

Referring to FIGS. 1 to 3, the valve set of the present invention comprises a valve body 1, a flexible plate 2, a core member 3, a spring 4 and a bottom cap 5. The valve body 1 has a central hole 11 defined therethrough and multiple passages 12 are defined through the valve body 1 and located around the central hole 11. Multiple protrusions 13 extend from the valve body 1 and are located between the passages 12. A tubular portion 14 extends from the valve body 1 and a connection flange 15 extends from the periphery of the valve body 1 so as to be connected with objects such as toys. The connection flange 15 has a strip 16 extending therefrom and a top cap 17 is connected to the strip 16. A tab 172 extends from the top cap 17 so that the users can hold the tab 172 to operate the top cap 17. The tubular portion 14 includes a lip 141 extending inward from an inner periphery of the distal end thereof.

The flexible plate 2 is a mushroom-shaped member and has an insertion 21 which is inserted into the central hole 11 of the valve body 1 from the underside of the valve body 1. The insertion 21 includes an opening at the bottom thereof and a hollow interior space. The flexible plate 2 includes a contact surface 22 which is in contact with the underside of the valve body 1 so as to seal the passages 12 from the underside of the valve body 1.

The core member 3 is engaged with the tubular portion 14 of the valve body 1 and restricted by the lip 141. An inlet tube 31 extends from the core member 3 and has a shoulder 32 on an outer surface thereof. Multiple releasing probes 33 extending from an underside of the core member 3.

The spring 4 is mounted to the inlet tube 31 of the core member 3 and biased between the shoulder 32 and an inner surface of the valve body 1 such that the core member 3 applies a force toward the flexible member 2.

Figure 4:
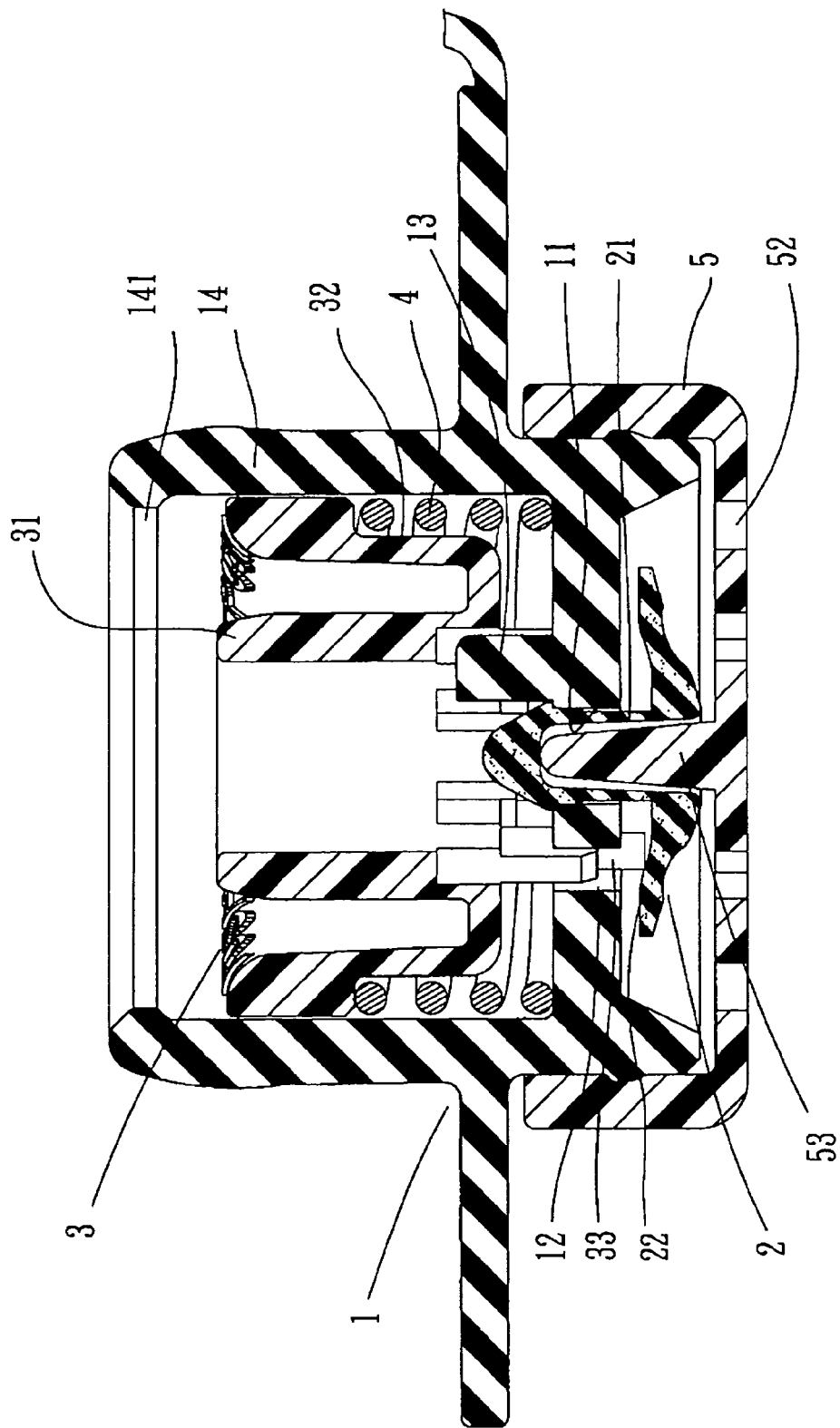
FIG. 4 is a cross sectional view, taken along line A-A in FIG. 2, and shows that the flexible plate is pushed away from the passages of the valve body.

When introducing air into the valve set, the air can be introduced into the valve set via the inlet tube 31 of the core member 3 by user's mouth or by pumping devices. Air pushes the flexible plate 2 via the passages 12 and the contact surface 22 of the flexible plate 2 is moved away from the passages 12 so as to inflate the toy (not shown) connected with the valve set. When releasing the air from the toy, the user pushes the core member 3 downward so that the releasing probes 33 push contact surface 22 of the flexible plate 2 away from the passages 12 as shown in FIG. 4, air in the toy is released.

Figure 5:
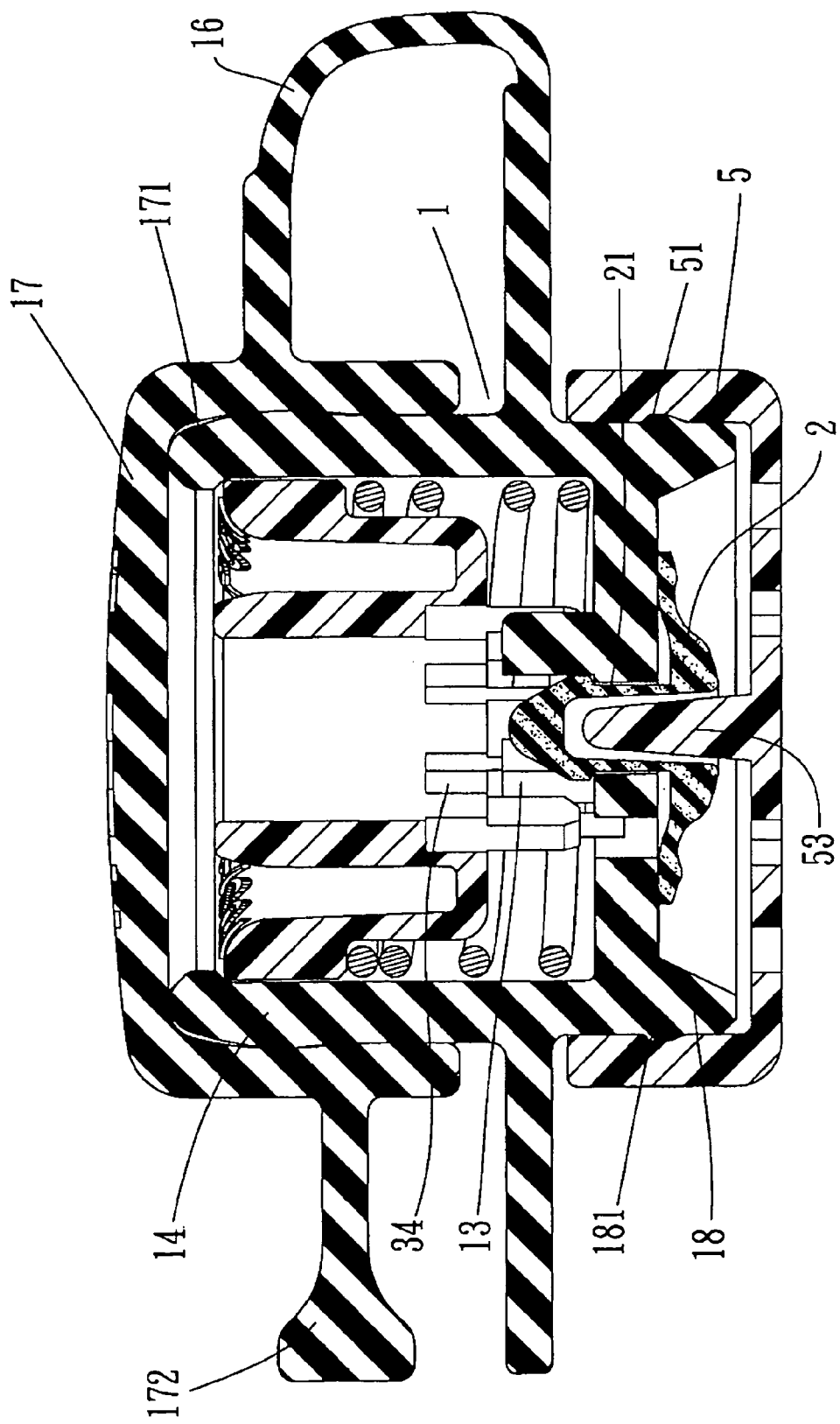
FIG. 5 is a cross sectional view of the valve set of the present invention, wherein the top cap is mounted.

As shown in FIG. 5, a groove 171 is defined in the top cap 17 and the tubular portion 14 includes a protrusion portion on an outer surface thereof. The top cap 17 is mounted to the tubular portion 14 and the protrusion portion is engaged with the groove 171 of the top cap 17. The users can hold the tab 172 and remove the top cap 17 from the tubular portion 14. An extension tube 18 extends from the underside of the valve body 1 and includes a rib 181 extending from an outer periphery thereof. A bottom cap 5 is mounted to the extension tube 18 and has a engaging groove 51 defined therein which is engaged with the rib 181. A stud 53 extends from a center of the bottom cap 5 and is inserted into the hollow interior space of the insertion 21 on the flexible plate 2 to position the flexible plate 2. The bottom cap 5 includes multiple ventilation holes 52.

The core member 3 includes multiple engaging holes 34 with which the protrusions 13 are engaged to avoid the core member 3 from rotating.

While we have shown and described the embodiment in accordance with the present invention, it should be clear to those skilled in the art that further embodiments may be made without departing from the scope of the present invention.

What is claimed is:

1. A valve set comprising:
   a valve body having a central hole defined therethrough and multiple passages defined around the central hole, a tubular portion extending from the valve body and having a lip extending inward from an inner periphery thereof, an extension tube extending from an underside of the valve body and including a rib extending from an outer periphery thereof, a bottom cap mounted to the extension tube and having an engaging groove defined therein which is engaged with the rib, the bottom cap including multiple ventilation holes;
   a flexible plate having an insertion inserted into the central hole of the valve body and the flexible plate sealing the passages from the underside of the valve body, a stud extending from a center of the bottom cap and inserted into the insertion on the flexible plate to position the flexible plate;
   a core member engaged with the tubular portion and restricted by the lip, an inlet tube extending from the core member and having a shoulder on an outer surface thereof, multiple releasing probes extending from an underside of the core member, and
   a spring mounted to the inlet tube and biased between the shoulder and an inner surface of the valve body, air being introduced into the valve set via the inlet tube, air being released when the core member is moved and the releasing probes push the flexible plate away from the passages.

2. The valve set as claimed in claim 1, wherein a connection flange extends from the valve body.

3. The valve set as claimed in claim 2, wherein the connection flange has a strip extending therefrom and a top cap is connected to the strip, a groove is defined in the top cap and the tubular portion includes a protrusion portion on an outer surface thereof, the top cap is mounted to the tubular portion and the protrusion portion is engaged with the groove of the top cap.

4. The valve set as claimed in claim 1, wherein multiple protrusions extending from the valve body and located between the passages, the core member includes multiple engaging holes with which the protrusions are engaged to avoid the core member from rotating.

* * * * *